(12) United States Patent
Sayre et al.

(10) Patent No.: US 8,894,318 B2
(45) Date of Patent: Nov. 25, 2014

(54) REBOUND CONTROL MATERIAL

(75) Inventors: Jay R. Sayre, Gahanna, OH (US); Carl J. Serman, Cranberry Township, PA (US); Kary L. Valentine, Mars, PA (US); Chuck A. Plaxico, Westerville, OH (US); Charles R. Miele, Upper Arlington, OH (US); James C. Kennedy, Worthington, OH (US)

(73) Assignee: Battelle Memorial Institute, Columbus, OH (US)

( * ) Notice: Subject to any disclaimer, the term of this patent is extended or adjusted under 35 U.S.C. 154(b) by 253 days.

(21) Appl. No.: 12/922,727

(22) PCT Filed: Mar. 16, 2009

(86) PCT No.: PCT/US2009/037253
§ 371 (c)(1),
(2), (4) Date: Nov. 30, 2010

(87) PCT Pub. No.: WO2009/117348
PCT Pub. Date: Sep. 24, 2009

(65) Prior Publication Data
US 2011/0091273 A1    Apr. 21, 2011

Related U.S. Application Data

(60) Provisional application No. 61/037,067, filed on Mar. 17, 2008.

(51) Int. Cl.
*C08G 18/00* (2006.01)
*E01F 13/00* (2006.01)
*C08G 18/32* (2006.01)
*E01F 15/14* (2006.01)
*C08G 18/48* (2006.01)
*C08G 18/10* (2006.01)

(52) U.S. Cl.
CPC .......... *E01F 15/146* (2013.01); *C08G 18/3215* (2013.01); *C08G 2350/00* (2013.01); *C08G 18/4854* (2013.01); *C08G 18/10* (2013.01)
USPC ................................................ 404/6; 528/65

(58) Field of Classification Search
USPC ..................... 404/6, 10; 528/65, 66
See application file for complete search history.

(56) References Cited

U.S. PATENT DOCUMENTS 3,672,657 A    6/1972    Young et al.
3,674,115 A    7/1972    Young et al.

(Continued)

FOREIGN PATENT DOCUMENTS

DE    31 06 694    9/1992
DE    101 13 443    9/2002

(Continued)

OTHER PUBLICATIONS

Written Opinion dated Sep. 21, 2010 for Application No. PCT/US09/037253.

(Continued)

*Primary Examiner* — Abigail A Risic
(74) *Attorney, Agent, or Firm* — Frost Brown Todd LLC

(57) ABSTRACT

An impact attenuator system including a hyperelastic member that comprises an energy absorbing material with a tan δ of not less than about 0.05 to assist rebound control.

18 Claims, 16 Drawing Sheets

(56) References Cited

U.S. PATENT DOCUMENTS

| | | | |
|---|---|---|---|
| 3,680,662 A | | 8/1972 | Walker et al. |
| 3,845,936 A | | 11/1974 | Boedecker, Jr. et al. |
| 3,847,678 A | | 11/1974 | Furr |
| 3,856,268 A | | 12/1974 | Fitch |
| 3,856,288 A | | 12/1974 | Alvarez |
| 3,982,734 A | | 9/1976 | Walker |
| 4,237,240 A | | 12/1980 | Jarre et al. |
| 4,321,989 A | | 3/1982 | Meinzer |
| 4,352,484 A | | 10/1982 | Gertz et al. |
| 4,407,484 A | | 10/1983 | Meinzer |
| 4,452,431 A | | 6/1984 | Stephens et al. |
| 4,485,719 A | * | 12/1984 | Mendelsohn et al. ........ 89/1.816 |
| 4,559,366 A | | 12/1985 | Hostettler |
| 4,583,716 A | | 4/1986 | Stephens et al. |
| 4,604,940 A | * | 8/1986 | Mendelsohn et al. ........ 89/1.816 |
| 4,645,375 A | | 2/1987 | Carney, III |
| 4,674,911 A | | 6/1987 | Gertz |
| 4,722,946 A | * | 2/1988 | Hostettler ....................... 521/158 |
| 4,798,851 A | | 1/1989 | Werner et al. |
| 4,815,565 A | | 3/1989 | Sicking et al. |
| 5,011,326 A | | 4/1991 | Carney, III |
| 5,013,810 A | * | 5/1991 | Sarpeshkar et al. ............. 528/59 |
| 5,112,028 A | | 5/1992 | Laturner |
| 5,195,727 A | | 3/1993 | Liao et al. |
| 5,246,977 A | | 9/1993 | Mussini |
| 5,314,261 A | | 5/1994 | Stephens |
| 5,403,122 A | | 4/1995 | Granella |
| 5,462,144 A | | 10/1995 | Guardiola et al. |
| 5,568,913 A | * | 10/1996 | Nagler ........................... 256/13.1 |
| 5,579,699 A | | 12/1996 | Dannawi et al. |
| 5,607,252 A | * | 3/1997 | Tischer ............................... 404/6 |
| 5,660,116 A | | 8/1997 | Dannawi et al. |
| 5,723,530 A | | 3/1998 | Zanzig et al. |
| 5,733,062 A | | 3/1998 | Oberth et al. |
| 5,746,419 A | | 5/1998 | McFadden et al. |
| 5,791,811 A | | 8/1998 | Yoshino |
| 5,797,592 A | | 8/1998 | Machado |
| 5,851,005 A | | 12/1998 | Muller et al. |
| 5,860,762 A | * | 1/1999 | Nelson ............................... 404/6 |
| 5,868,521 A | | 2/1999 | Oberth et al. |
| 5,957,435 A | | 9/1999 | Bronstad |
| 6,010,275 A | | 1/2000 | Fitch |
| 6,085,878 A | | 7/2000 | Araki et al. |
| 6,126,144 A | | 10/2000 | Hirsch et al. |
| 6,149,134 A | | 11/2000 | Bank et al. |
| 6,168,346 B1 | | 1/2001 | Ernsberger |
| 6,179,516 B1 | | 1/2001 | Ivey et al. |
| 6,248,244 B1 | | 6/2001 | Dann |
| 6,340,268 B1 | | 1/2002 | Alberson et al. |
| 6,395,798 B1 | | 5/2002 | Younes |
| 6,409,417 B1 | | 6/2002 | Muller et al. |
| 6,410,609 B1 | | 6/2002 | Taylor et al. |
| 6,427,983 B1 | | 8/2002 | Leonhardt et al. |
| 6,461,076 B1 | | 10/2002 | Stephens et al. |
| 6,465,560 B1 | | 10/2002 | Zanzig et al. |
| 6,486,224 B2 | | 11/2002 | Lin et al. |
| 6,533,250 B2 | | 3/2003 | Arthur |
| 6,533,495 B1 | | 3/2003 | Williams et al. |
| 6,536,985 B2 | | 3/2003 | Albritton |
| 6,536,986 B1 | | 3/2003 | Anghileri et al. |
| 6,540,434 B1 | | 4/2003 | Hotchkin |
| 6,551,010 B1 | | 4/2003 | Kiedaisch et al. |
| 6,554,529 B2 | | 4/2003 | Stephens et al. |
| 6,566,482 B2 | | 5/2003 | Haas et al. |
| 6,623,204 B2 | | 9/2003 | Buehler |
| 6,733,707 B1 | | 5/2004 | Serman et al. |
| 6,737,471 B2 | | 5/2004 | Lorenz et al. |
| 6,773,201 B2 | | 8/2004 | Witcher |
| 6,863,467 B2 | | 3/2005 | Buehler et al. |
| 6,942,263 B2 | | 9/2005 | Welch et al. |
| 7,168,880 B2 | | 1/2007 | Kennedy, Jr. et al. |
| 7,300,223 B1 | | 11/2007 | Kennedy, Jr. et al. |
| 7,307,136 B2 | | 12/2007 | Bleys et al. |
| 7,481,600 B2 | * | 1/2009 | Barton ............................... 404/10 |
| 2001/0014254 A1 | | 8/2001 | Albritton |
| 2002/0090260 A9 | | 7/2002 | Albritton |
| 2002/0103325 A1 | * | 8/2002 | Bleys et al. ..................... 528/76 |
| 2003/0057410 A1 | | 3/2003 | Denman et al. |
| 2003/0168650 A1 | | 9/2003 | Alberson et al. |
| 2003/0175076 A1 | | 9/2003 | Albritton |
| 2003/0210953 A1 | | 11/2003 | Williams et al. |
| 2003/0215285 A1 | * | 11/2003 | Leonhardt et al. ................ 404/6 |
| 2003/0234390 A1 | | 12/2003 | Bronstad |
| 2004/0016916 A1 | | 1/2004 | Bronstad |
| 2004/0074723 A1 | | 4/2004 | Tsai et al. |
| 2004/0129518 A1 | | 7/2004 | Tamada et al. |
| 2004/0195064 A1 | | 10/2004 | Tamada et al. |
| 2006/0103061 A1 | * | 5/2006 | Kennedy et al. ............. 267/116 |
| 2008/0181722 A1 | * | 7/2008 | McKenney et al. ............... 404/6 |
| 2009/0250675 A1 | * | 10/2009 | Cashin et al. ................. 256/13.1 |

FOREIGN PATENT DOCUMENTS

| | | |
|---|---|---|
| EP | 0 149 567 | 7/1985 |
| EP | 0 437 414 | 7/1991 |
| EP | 0 449 331 | 10/1991 |
| EP | 1 125 766 | 8/2001 |
| JP | 61-019618 A | 1/1986 |
| JP | 07-188378 A | 7/1995 |
| JP | 10-101848 A | 4/1998 |
| JP | 2000-163078 A | 6/2000 |
| JP | 2001200513 | 7/2001 |
| JP | 2002-544353 A | 12/2002 |
| JP | 2004-300342 A | 10/2004 |
| JP | 2009-102566 | 5/2009 |
| WO | WO 00/50483 | 8/2000 |
| WO | WO 2006/121069 | 12/2002 |

OTHER PUBLICATIONS

BAYTEC® GS-V85A, Cast Elastomer System, Bayer Corporation (May 1998) pp. 1-2.
International Search Report dated Aug. 18, 2009 for Application No. PCT/US2009/037253.
Office Action dated Sep. 11, 2009 for U.S. Appl. No. 11/567,515.
Office Action dated Jan. 26, 2010 for U.S. Appl. No. 11/567,515.
Office Action dated Sep. 9, 2010 for U.S. Appl. No. 11/567,515.
Parks et al.; Generation of Microcellular Polyurethans Via Polymerization in Carbon Dioxide. II: Foam Formation and Characterization; Polymer Engineering and Science Mid-Oct. 1996; Col. 36; No. 19, pp. 2417-2431.
Woods, G., The ICI Polyurethanes Book, $2^{nd}$ Ed., published jointly by ICI Polyurethanes and John Wiley & Sons: polyols, pp. 35-41 and Case Polyurethan Elastomers (CPU), pp. 182-187; printed in Netherland.
C.M. Roland, Mechanical Behavior of Rubber at High Strain Rates, Rubber Chemistry and Technology, 2006, pp. 429-459, vol. 79.
Office Action dated Mar. 31, 2012 for Chinese Application for Invention No. 200980115976.0.
Australian Office Action dated Jun. 5, 2013 for Application No. AU 2009225760, Patent Examination Report No. 2.
Australian Office Action dated Sep. 13, 2013 for Application No. AU 2013200858, Patent Examination Report No. 1.
Japanese Office Action dated Oct. 8, 2013 for Application No. JP 2011-500885, Notification of Reasons for Refusal.
European Exam Report dated Nov. 16, 2011 for Application No. 09722853.0.
Chinese Office Action dated Nov. 26, 2012 for Application No. CN 200980115976.0, Notification of the Second Office Action.
English Machine Translation of Japanese Patent JP 2002-544353.
English Machine Translation of Japanese Patent JP 2004-300342.
Abstract for Japanese Patent No. JP 2009-102566.
Australian Patent Examination Report No. 3 dated Apr. 15, 2014 for Application No. AU 2009225760.
Canadian Office Action dated Jan. 30, 2014 for Application No. CA 2,721,238.
Japanese Office Action dated Aug. 5, 2014 for Application No. JP 2011-500885.

* cited by examiner (a)          (b)

REBOUND CONTROL MATERIAL

CROSS REFERENCE TO RELATED APPLICATIONS

The present application hereby claims the benefit of the provisional patent application of the same title, Ser. No. 61/037,067, filed on Mar. 17, 2008, the disclosure of which is hereby incorporated by reference in its entirety.

BACKGROUND

Many types of energy absorbing devices are positioned along highways and racetracks to prevent vehicles from crashing into stationary structures and to lessen the injuries to occupants of the vehicle and to lessen the impact and damage that will occur to the vehicle.

In the past, many of these devices have been rigid structures that restrain the vehicle from leaving the highway. One problem is that the vehicle itself is crushed and bears the brunt of the impact. Another problem with a rigid barrier is that the vehicle may rebound back onto the highway and into oncoming traffic. See for example, U.S. Pat. No. 3,845,936 to Boedecker, Jr. et al., issued Nov. 5, 1974, which discloses a rigid barrier composed of aligned barrels.

Other types of barriers include energy absorbing barrier devices that are placed along highways and raceways. Many types of such barrier have been proposed. For example, one type of barrier device uses one-time collapsible energy absorbing materials that are crushed or broken away upon impact. These types of devices are damaged or destroyed during impact and must be replaced after a single impact which is time consuming, expensive, and leaves the roadway unprotected during the repair time. See for example, U.S. Pat. No. 3,982,734, to Walker, issued Sep. 28, 1976; U.S. Pat. No. 4,321,989 to Meinzer issued Mar. 30, 1982; U.S. Pat. No. 4,352,484 to Gertz et al., issued Oct. 5, 1982; U.S. Pat. No. 4,815,565 to Sicking et al., issued Mar. 28, 1989; U.S. Pat. No. 5,797,592 to Machado, issued Aug. 25, 1998; U.S. Pat. No. 5,851,005 to Muller et al., issued Dec. 22, 1998; U.S. Pat. No. 5,957,435 to Bronstad, issued Sep. 28, 1999; U.S. Pat. No. 6,126,144 to Hirsch et al., issued Oct. 3, 2000; U.S. Pat. No. 6,409,417 to Muller et al., issued Jun. 25, 2002; U.S. Pat. No. 6,536,985 to Albritton, issued Mar. 25, 2003; US2001/0014254 to Albritton published Aug. 16, 2001; US2002/0090260 Albritton, published Jul. 11, 2002; US2003/0175076A1 to Albritton, published Sep. 18, 2003; US2003/0234390 to Bronstad, published Dec. 25, 2003; US2004/0016916 to Bronstad, published Jan. 29, 2004; EP 000149567A2 to DuPuis published Jul. 24, 1985; DE003106694A1 to Urberger, published September 1982;

U.S. Pat. No. 4,674,911 to Gertz, issued Jun. 23, 1987, relies on air chambers to supply resiliency to the barrier.

U.S. Pat. No. 4,407,484 to Meinzer, issued Oct. 4, 1983, discloses a barrier system that relies on springs for resiliency and attenuation of the vehicle's impact.

Various barrier systems use fluid to lessen the vehicle impact. See, for example: U.S. Pat. No. 4,452,431 to Stephens et al., issued Jun. 5, 1984, and U.S. Pat. No. 4,583,716 to Stephens et al., issued Apr. 22, 1986, disclose water filled buffer cartridges that are restrained with cables in a pivotable diaphragm. Likewise, U.S. Pat. No. 3,672,657 to Young et al., issued Jun. 27, 1972, and U.S. Pat. No. 3,674,115 to Young et al, issued Jul. 4, 1972, issued disclose liquid filled containers arranged in a barrier system; U.S. Pat. No. 3,680,662 to Walker et al., issued Aug. 1, 1972, shows clusters of liquid filled buffers.

Various other systems include reusable energy absorbing devices. For example: U.S. Pat. No. 5,112,028 to Laturner, issued May 12, 1992; U.S. Pat. No. 5,314,261 to Stephens, issued May 24, 1994; U.S. Pat. No. 6,010,275 to Fitch, issued Jan. 4, 2000; U.S. Pat. No. 6,085,878 to Araki et al., issued Jul. 11, 2000; U.S. Pat. No. 6,149,134 to Banks et al, issued Nov. 21, 2000; U.S. Pat. No. 6,553,495 to Williams et al., issued Mar. 18, 2003; U.S. Pat. No. 6,554,429 to Stephens et al., issued Apr. 29, 2003; US2003/0210953 A1 to Williams et al., published Nov. 13, 2003; JP 356131848A to Miura et al., published Oct. 15, 1981; EP 000437313A1 to Guerra, published Jul. 17, 1991.

U.S. Pat. No. 4,237,240 to Jane et al., issued Dec. 2, 1980, discloses a flexible polyurethane foam having a high-load bearing capacity and a large energy absorption capacity upon impact.

U.S. Pat. No. 4,722,946 to Hostettler, issued Feb. 2, 1988, discloses energy absorbing polyurethane elastomers and foams.

U.S. Pat. No. 6,410,609 to Taylor et al., issued Jun. 25, 2002, discloses low pressure polyurethane foams.

There is a need for an impact attenuator barrier system which minimizes or prevents injury to occupants of a vehicle.

There is a further need for an impact attenuator barrier system vehicle that is fully recoverable upon impact.

There is a further need for an impact attenuator barrier system that is economical, reliable in operation, and easy to install and maintain.

There is a further need for an impact attenuator barrier system that is useful in various environments, including, for example, public highways, racetrack, and marine applications including protecting piers.

There is a further need for an impact attenuator barrier system that will absorb impact energies from trucks and cars traveling at high speeds.

There is a further need for an impact attenuator barrier system that, when impacted, does not disintegrate and cause debris to be scattered around the site of impact.

There is a further need for an impact attenuator barrier system that controls the rate of rebound.

There is a further need for a self-recovering impact attenuator barrier system that controls the rate of rebound.

There is a further need for a self-recovering impact attenuator barrier system for which the energy absorbing material is also used to control the rate of rebound.

BRIEF SUMMARY

An impact attenuator barrier system for vehicle safety that benefits from the interrelationship of a number of features: the use of a cast thermoset polyurethane elastomeric composition in the impact attenuator barrier system, the method of forming such elastomeric composition using certain prescribed mixing and processing steps, the shape(s) of the elastomeric barrier members, the assembly and arrangement of the barrier members into the impact attenuator barrier system.

In another embodiment, an impact attenuator system may have side beam assemblies and a nose assembly secured to the side beam assemblies. The side beam assemblies include a plurality of side panels where adjacent side panels overlap such that the side panel members are in a nested linear arrangement. At least one diaphragm panel is positioned between opposing side panels and is secured to the opposing side panels by at least one securing mechanism. The opposing side panels and the diaphragm panels define at least one bay. At least one hyperelastic member is positioned in the at least one bay, wherein the hyperelastic members have differing stiffness. At least one anchoring system includes at least one cable which secures the side panels and diaphragm panels together.

In another embodiment, an impact attenuator system may have a hyperelastic member comprises an energy absorbing material with a tan δ of not less than 0.05 for temperatures between −15° C. and 45° C.

In another embodiment, the hyperelastic material may be formed from a mixture comprising: an MDI-polyether prepolymer, wherein the prepolymer had a free isocyanate content of from about 10% to about 15%; at least one long chain polyether or polyester polyol, wherein the polyol had an OH# of from about 20 to about 80; at least one short chain diol, wherein the diol was from about 30% to about 45% of the total hydroxyl-containing components; at least one catalysts; and wherein the proportion of the components provided from about 2% to about 10% excess isocyanate groups.

It is to be understood that the hyperelastic material may be suitable for a wide variety of other types of products. Examples of such products include, but are not limited to, protective gear for work and sports, including helmets and pads, car seats, pedestal seats on helicopters, bumpers for loading docks, and the like.

Various objects and advantages will become apparent to those skilled in the art from the following detailed description when read in light of the accompanying drawings.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure. U.S. Pat. No. 7,300,223 is incorporated in and constitutes a part of this specification.

DETAILED DESCRIPTION

Figure 1:
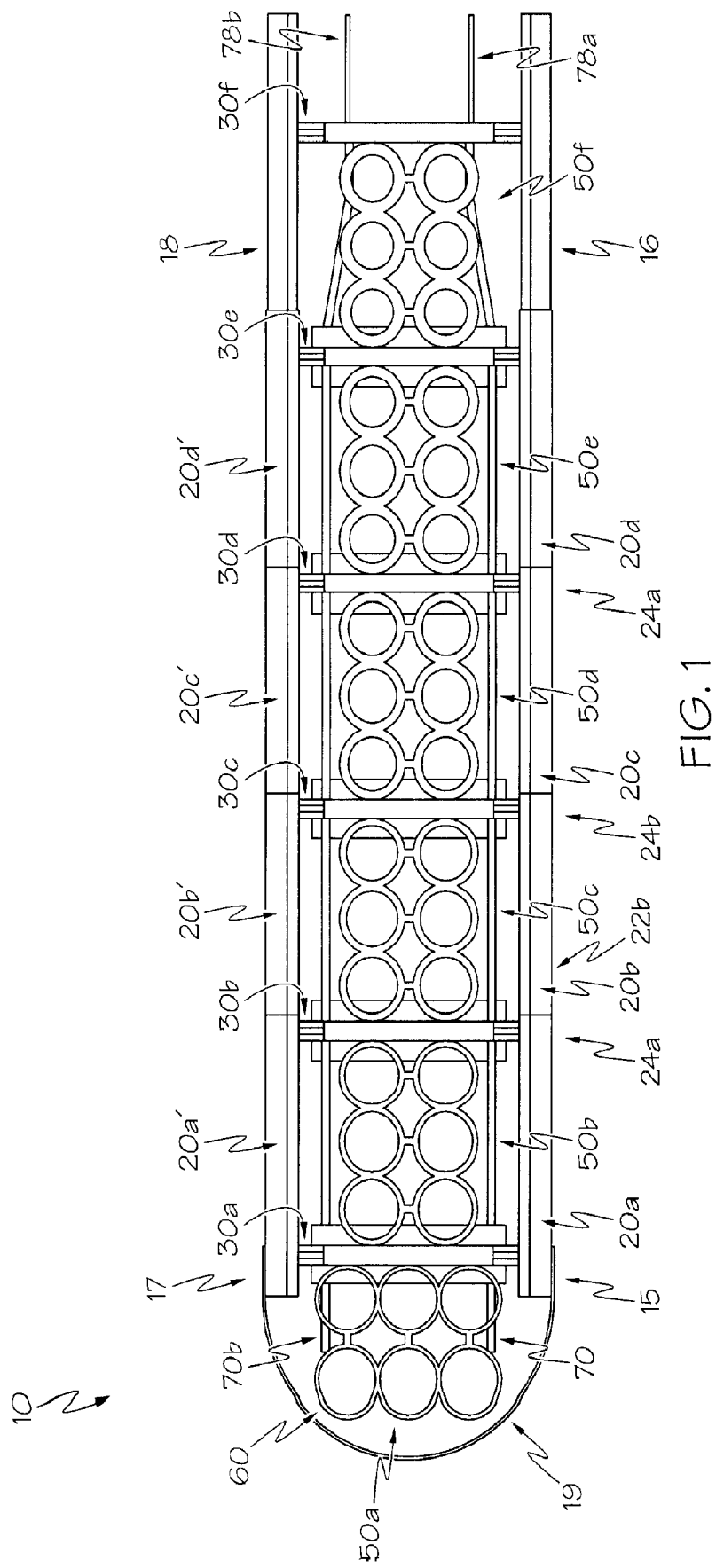
FIG. 1 is a schematic illustration, in plan view, of one embodiment of an impact attenuator system.
Figure 2:
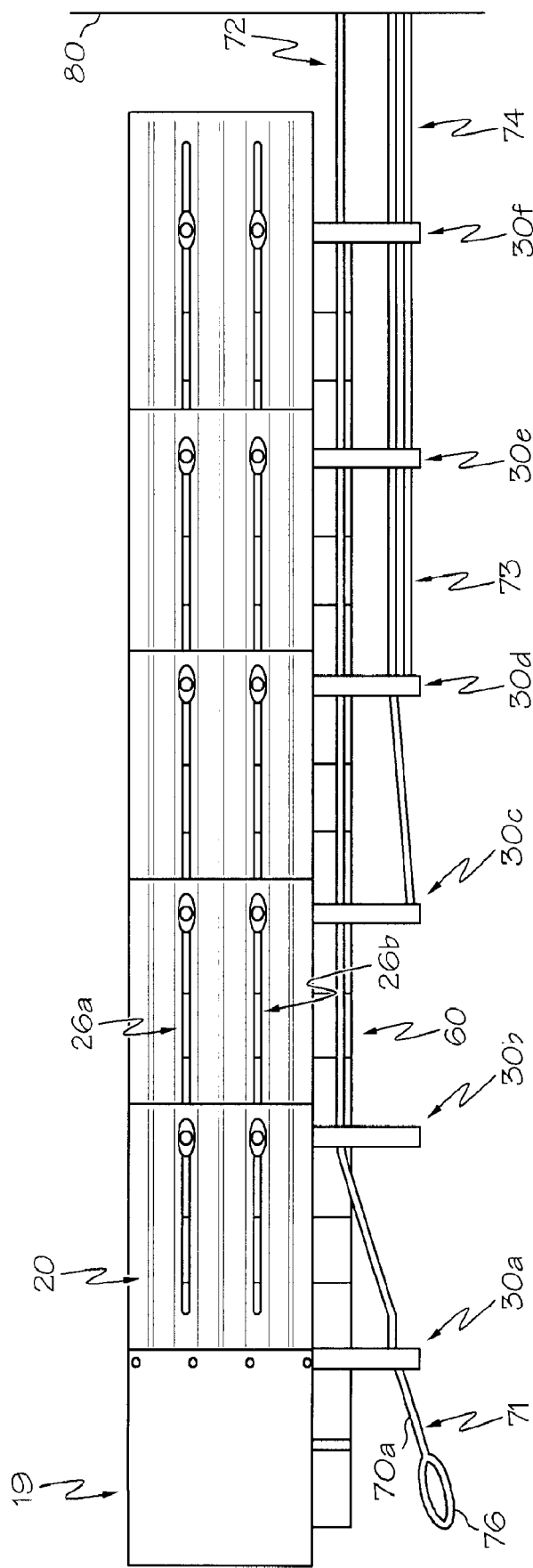
FIG. 2 is a schematic illustration, in side elevation view, of the embodiment shown in FIG. 1.

One method of characterizing viscoelastic polymeric materials is by measuring its complex modulus, $E^*=E'-iE"$, where E' and E" are generally referred to as the storage modulus and loss modulus respectively. The magnitude of the complex modulus, $|E^*|$, is defined as $[(E')^2+(E")^2]^{1/2}$, and also represents the ratio of maximum stress to maximum strain ($\sigma_0/\epsilon_0$). Measurement of the storage modulus and loss modulus allow comparisons of the materials ability to return energy to its ability to lose energy. The storage modulus E' and loss modulus E" may be measured by Dynamic Mechanical Analysis (DMA).

The storage modulus E' is associated with energy storage and release during periodic deformation. The loss modulus E" is associated with the dissipation of energy and its transformation into heat. The ratio of these effects (E"/E') is tan δ, where δ is the phase lag between the applied force and the materials response to that force. The parameter tan δ is widely used as a measure of the damping capacity of viscoelastic materials.

As stress is removed from elastomers and they return to their original shape, the movement is exothermic resulting in energy loss that dampens the rebound. Materials with a larger tan δ have a larger loss modulus and consequently dampen the rate of rebound.

Device

An impact attenuator barrier system may be used in vehicle applications such as racetracks and highways or in protecting piers and the like. It may incorporate an array of unique, fully recoverable hyperelastic energy absorbing elements.

An impact attenuator barrier system may be a roadway barrier comprising at least one hyperelastic member, wherein the hyperelastic member comprises an energy absorbing material that behaves in a rate-independent hyperelastic manner wherein its permanent set is minimized so that the energy absorbing material maintains consistent force-displacement characteristics over a wide range of impact velocities while remaining fully recoverable.

An embodiment of the impact attenuator system 10 is shown in FIGS. 1-6. The impact attenuator system 10 includes a first side beam assembly 12 (not called out) and an opposing, or second, side beam assembly 14 (not called out). The first and second beam assemblies 12 and 14 are in opposed relationship. In the embodiments shown, the first and second beam assemblies 12 and 14 are in opposed and parallel relationship.

In one embodiment, the beam assemblies are parallel and the energy absorbing units in each bay from front to rear have a graduated, (increasing) stiffness from front to rear. This overall stiffness gradient increasing from front to rear can be accomplished by several means, typically, but not limited to varying wall thickness, geometry, or material properties of the energy absorbing elements. For, example, in certain highway applications, to accommodate abutment geometry and/or provide stage reaction force from the system in order to provide softer response in the early stage of impact and a more stiff response as the vehicle proceeds further into the system). In one embodiment the energy absorbing units may have a stiffness gradient that increases from rear to front. In another embodiment the energy absorbing units may be varying stiffness but are arranged in any order.

In other embodiments, the beam assemblies do not need to be parallel. For, example, in certain highway applications, it is desired that the beam assemblies have a tapered configuration in order to accommodate abutment geometry and/or provide stage reaction force from the system (e.g., the rear bays may incorporate a more narrow array of energy dissipating material while the front bays incorporate a more narrow array of energy dissipating material to provide softer response in the early stage of impact and a more stiff response as the vehicle proceeds further into the system). The first beam assembly 12 has a first, or leading, end 15 and a second end 16. Likewise, the second beam assembly 14 has a first, or leading, end 17 and a second end 18.

The impact attenuator system 10 also includes a nose assembly 19 that is secured in a suitable manner to the first end 15 of the first beam assembly 12 and to the first end 17 of the second beam assembly 14.

Figure 3:
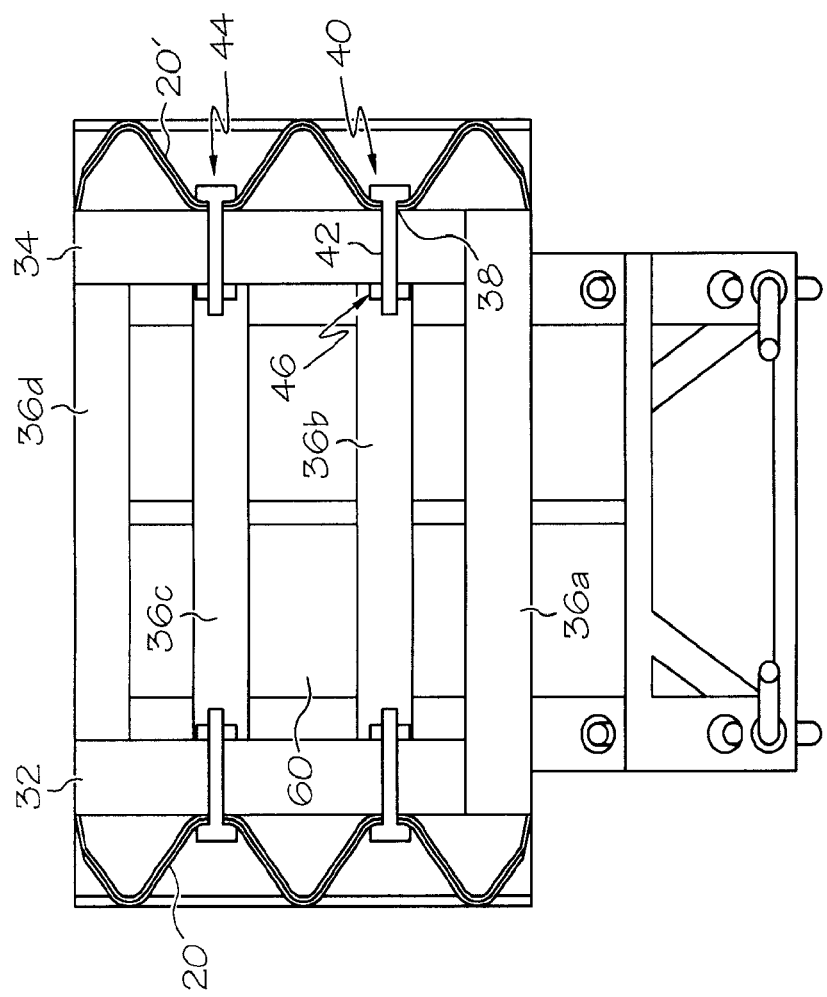
FIG. 3 is a schematic illustration, in an end elevational view.
Figure 4:
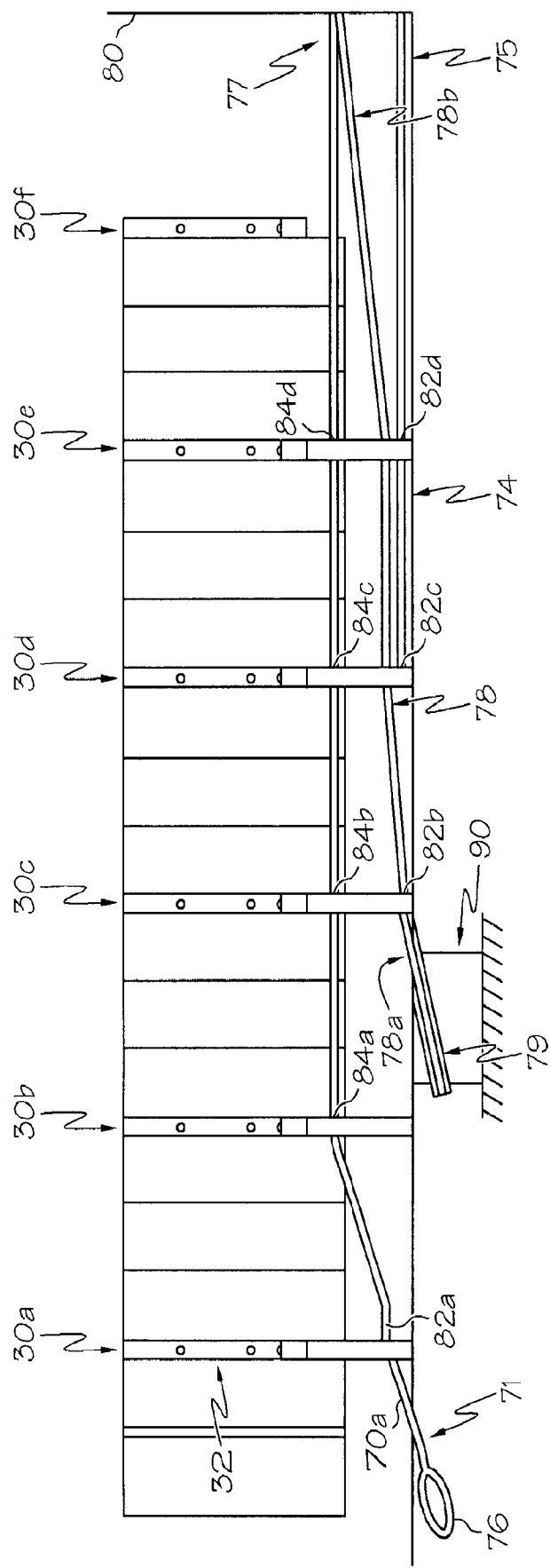
FIG. 4 is a schematic illustration, in side elevation.
Figure 5:
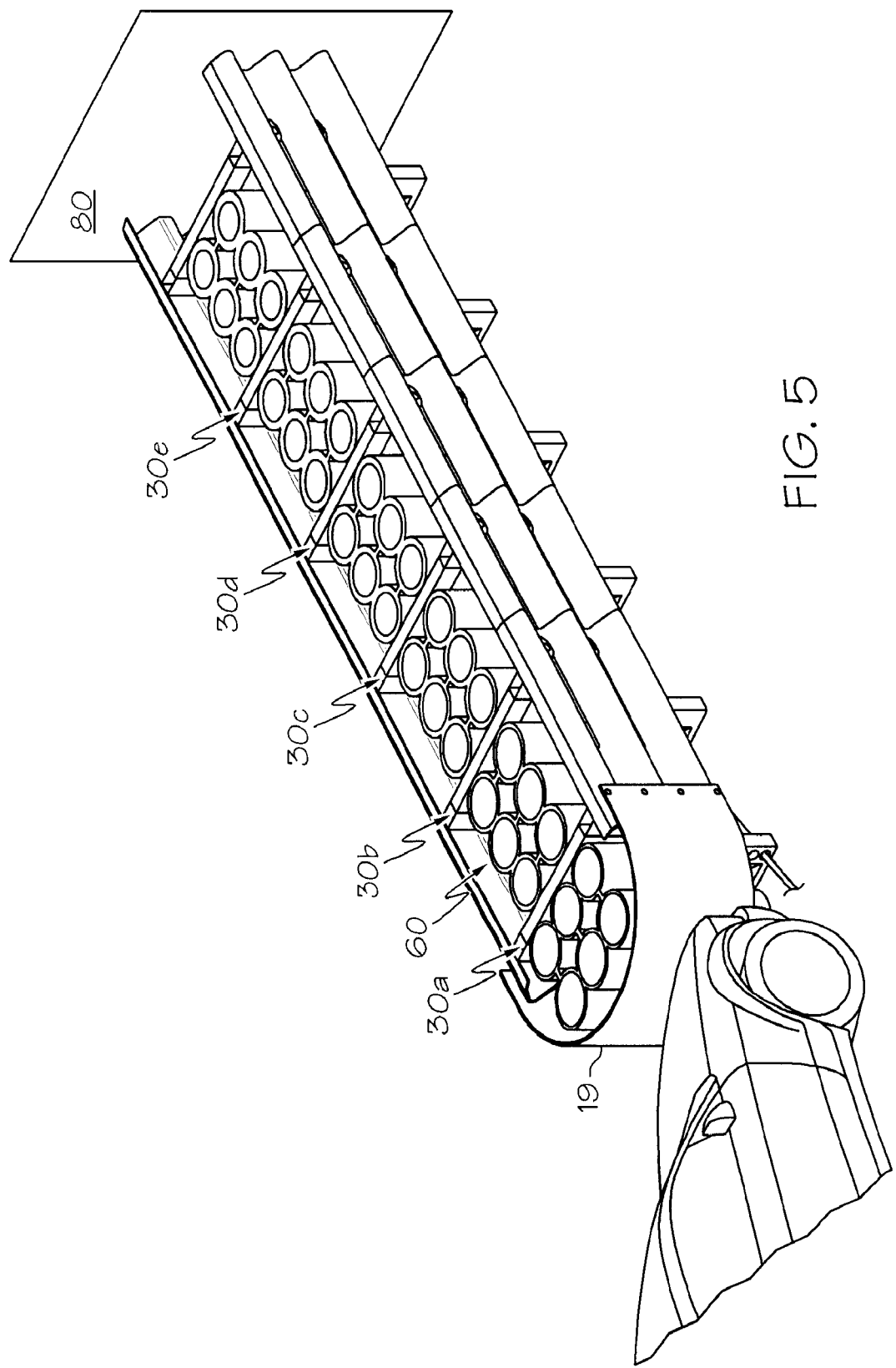
FIG. 5 is a schematic illustration, in a perspective view, of the embodiment shown in FIG. 1.

Each side beam assembly 12 and 14 further includes a plurality of side panels generally shown here as 20a, 20b, 20c, 20d and 20e. For ease of illustration it should be understood that each side beam assembly 12 and 14 have similar side panel members where the side panels that comprise the side beam assembly 12 are designated as 20a-20e and the side panels that comprise the side beam assembly 14 are designated as 20a'-20e'; only one side will be discussed in detail for ease of explanation. The first side panel 20a has a first end 22a (not called out) and a second end 24a; likewise each subsequent panel 20b, etc. has first ends 22b, etc., and second ends 24b, etc. The second end 24a overlaps the first end 22b of the adjacent panel 20b. Likewise, each adjacent panel has overlapping first and second ends. The side panel members 20a-20d are in a nested linear arrangement. The side panel members 20a'-20d' are also in a nested linear arrangement. Each side panel 20 can have a three-dimensional shape, such as a wave, or corrugated, shape, as shown in FIGS. 3 and 5. Side panels 20 may have other suitable dimensions, as apparent from the following description.

Each side panel 20 generally defines at least one longitudinally extending opening 26. As seen in the embodiment shown in FIG. 2, each side panel 20 has an upper longitudinally extending opening, or slot, 26a and a lower longitudinally extending opening, or slot, 26b that are in parallel relationship. The slot 26a on the side panel 20a at least partially overlaps the adjacent slot 26a on the adjacent side panel 20b; likewise, each adjacent side panel has overlapping slots 26.

The impact attenuator system 10 further includes a plurality of diaphragm panels generally shown here as 30a, 30b, 30c, 30d, 30e and 30f. For ease of illustration it should be understood that each diaphragm panel can have the same features, and that only one diaphragm panel will be discussed in detail for ease of explanation. As seen in FIG. 3, each of the diaphragm panels 30 can be comprised of first and second upright members 32 and 34 and at least one or more cross members, generally shown as 36a, 36b, 36c, and 36d, which extend between the first and second upright members 32 and 34. The first and second upright members include a plurality of spaced apart openings 38. Each opening 38 can receive a securing mechanism 40. In other embodiments, the diaphragm panel 30 can have other configurations for the cross members 36, such as formed into an X shape (not shown) or other suitable configuration.

The first diaphragm panel 30a is positioned between opposing side panels 20a and 20a' at substantially a right angle. The first diaphragm panel 30a is secured to the opposing side panels 20a and 20a' by one of the securing mechanisms 40. The securing mechanism 40 can comprise at least one screw-type member 42 that can have a head that is wider than the width of the slot 26; alternatively the securing mechanism 40 can include at least one washer-type member 44 that axially fits over the screw-type member 42 such that the washer-type member has length and width dimensions that are greater than the width of the slot 26. The screw-type member 42 extends from the outer surface of the side panel 20 through the slot 26, through the adjacent opening 38 in the upright member 32 (or 34) of the diaphragm panel 30, and is held in position with a suitable locking member 46, such as a hex nut. It is to be understood that the securing mechanism 40 is capable of being longitudinally moved along the slot 26, as will be more fully explained below.

As at least partially assembled, the impact attenuator system 10 includes a plurality of opposing side panels 20a-20e and 20a'-20e' and a plurality of diaphragm panels 30a-30f. As assembled, the first opposing side panels 20a and 20a' are secured to the first diaphragm panel 30a. That is, the first upright member 32 of the diaphragm panel 30 is secured to the first side panel 20a and the second upright member 34 of the diaphragm panel 30a is secured to the first opposing side panel 20a' by having securing mechanisms 40 extend through the slots 26 in the side panels 20 and through the adjacent opening 38 in the upright member 32 (or 34). Likewise, the remaining side panels are secured to the remaining diaphragm panels.

The impact attenuator system 10 thus defines a plurality of bays 50a-50f. Each bay 50 is defined by the opposing side panels 20 and diaphragm panels 30. As best seen in FIG. 1, the bay 50a is defined by the opposing side panels 20a and 20a' and by the diaphragm panel 30a and the nose assembly 19. Likewise, the remaining bays 50b-50f are defined by corresponding side panels and diaphragm panels. It is to be understood that the impact attenuator system 10 can include fewer or more side panels and diaphragm panels, and that the numbers and dimensions of such side panels and diaphragm panels will depend, at least in part, on the end use and the object which is being protected.

The impact attenuator system 10 includes a plurality, or array, of hyperelastic members 60. In the embodiment shown, each hyperelastic member 60 has a substantially tubular sidewalls 62. It is to be understood that the hyperelastic members 60 can have dimensions that best meet the end use requirements. For example, in one embodiment, as shown in the figures herein, the hyperelastic members 60 have conjoined tubular shapes where the wall thicknesses may vary from thinnest in the front hyperelastic members graduated to thicker hyperelastic member wall thicknesses towards the rear hyperelastic member 60 to most effectively absorb impact energies, as will be further explained below.

The impact attenuator system 10 further includes first and second anchoring systems 70a and 70b. For ease of illustration it should be understood that each anchoring systems 70a and 70b can have the same features, and that only one anchoring system 70 will be discussed in detail for ease of explanation. In the embodiment shown, the anchoring system 70 includes upper and lower cables 72 and 74 which are secured at their first ends 71 and 73, respectively, to a first, or front, anchoring mechanism 76 such as a loop or other device. In the embodiment shown, the upper and lower cables 72 and 74 are secured at their second ends 75 and 77, respectively, to second, or rear, anchoring mechanisms 80. In other embodiments, the anchoring system 70 can comprise fewer or more cables. The front anchoring mechanism 76 is securely anchored to the ground (not shown) in a suitable manner at or below ground level in front of the impact attenuator system 10. As best seen in the embodiment shown in FIG. 4, the lower cable 74 extends through a lower cable guide opening 82 in each of the upright members 32 in each of the diaphragm panels 30. In the embodiment shown, the lower cable 74 extends in a rearward direction at approximately three inches above ground and is attached to an anchor system 80 at cable height in the rear of the impact attenuator system 10.

The upper cable 72 extends through an upper cable guide opening 84 in each of the upright members 32 in each of the diaphragm panels 30. In the embodiment shown, the first diaphragm panel 30a has its upper cable guide opening 84a at a spaced apart first distance from the lower cable guide opening 82a; the second diaphragm panel 30b has its upper cable guide opening 84b at a spaced apart second distance from the lower cable guide opening 82b. The first distance is less than the second distance such that the upper cable 72 is first guided in an upward direction from the front anchoring mechanism 76 and is guided in an upward direction from the first diaphragm panel 30a to the second diaphragm panel 30b. Thereafter, the upper cable 72 extends from the second diaphragm panel 30b through the diaphragm panels 30c-30f in a rearward direction that is substantially parallel to the lower cable 74. Both the upper cable 72 and the lower cable 74 are anchored at the second anchoring mechanism 80. In the embodiment shown, the portion of the upper cable 72 that extends through the diaphragm panels 30c-30f is about fifteen inches above ground level.

The impact attenuator system 10 further may include at least one mid-length anchoring system 90. In the embodiment shown, the anchoring system 90 includes at least one middle cable 78 which is secured at its first end 78a, and wrap around a large diameter (12"-14" Diameter) guide 79 which is below ground, and then back to the opposite-side location where the second end is secured 78b. In the embodiment shown, the middle cable is secured at its second end 78b, to second, or rear, anchoring mechanisms 80. In other embodiments, the middle anchoring system 90 can comprise fewer or more cables. The middle anchoring mechanism 90 is securely anchored to the ground (not shown) in a suitable manner at or below ground level between diaphragms. As seen in the embodiment shown in FIG. 4, the middle cable 78 extends through a middle cable guide opening 82 in several of the upright members 32 in each of the diaphragm panels 30. In the embodiment shown, the middle cable 78 extends in a rearward direction at approximately six inches above ground and is attached to an anchor system (not shown) at cable height in the rear of the impact attenuator system 10.

Figure 6:
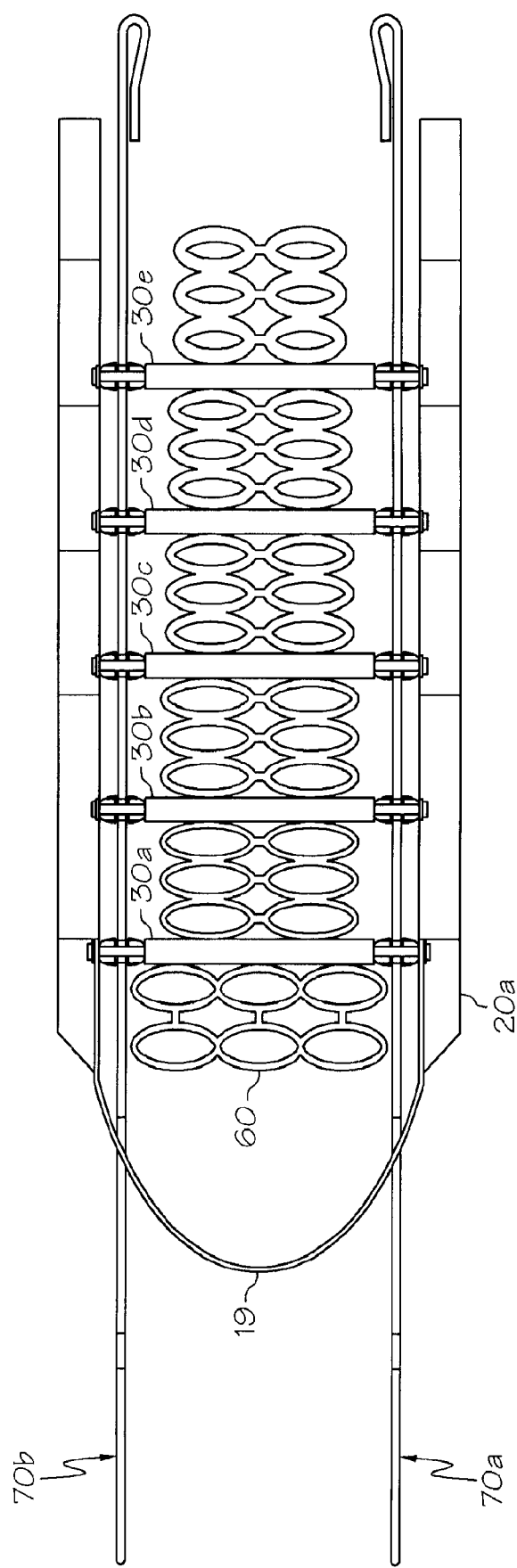
FIG. 6 is a schematic illustration, in plan view, of the embodiment of the impact attenuator system shown in FIG. 1 in a compressed state.

In an end-on impact where a vehicle first impacts the nose assembly 19, as schematically shown in FIGS. 5 and 6, the impact attenuator system 10 deforms by having the sets of nested side panels 20a-20a'-20f-20f' telescope onto adjacent side panels; that is, the side panels 20a-20a' through at least one set of the adjacent side panels 20b-20b' to 20f-20f' are moved by the impacting vehicle, allowing the impact attenuator system 10 to deflect in the longitudinal direction. Since each set of side panels 20a-20a'-20f-20f' is connected to the corresponding diaphragm panel 30a-30f by the plurality of individual securing mechanisms 40 that are positioned in the corresponding slots 26, the first set of side panels 20a-20a' may slide along the slots 26 in the second set of side panels 20b-20b', and so on. The distance the sets of side panels are displaced rearward and the number of set of side panels that are displaced rearward depends on the impact on the impact attenuator system 10.

This telescoping feature of the impact attenuator system 10 is intended to safely bring to a stop a vehicle that strikes the system 10 on its end and to subsequently return the system 10 to its original position. The number of bays 50, the number of hyperelastic elements 60 per bay, and the geometry of the hyperelastic elements 60 can be readily modified to accommodate specific applications of the system 10 depending on expected range impact energies. For example, the configuration of hyperelastic elements 60 and the number of bays 50 shown in FIG. 1 will safely stop a 3400-lb car impacting at a speed of 50 mph in a head-on impact. The maximum 10 ms average ride-down acceleration in this case is approximately 25-30 g's, which is a 70-75% reduction of the impact force compared to a frontal impact of the vehicle into a rigid wall at 50 mph.

The impact attenuator system 10 may have the ability to redirect vehicles that impact on the side of the system 10. To accommodate such side impacts, while not compromising the performance of the system in end-on impacts, the side panels 20 are preferably composed of short sections of overlapping steel or HDPE panels which distribute the impact forces between each bay 50 of the system during side impacts. During impacts on the side of the system 10, the impact forces are distributed from the side panels 20 through the diaphragms 30 to the cables 72 and 74, which act in tension to transfer the impacting load to the anchors, thereby allowing the system to safely redirect the vehicle away from the hazard. The materials that the panels may be constructed from include, but are not limited to, High Density Polyethylene, steel, aluminum, plastic, fiber reinforced plastic and various composite materials. In certain embodiments, it is preferred that the material be recoverable, or semi-recoverable, produce no, or very little, debris when impacted by a vehicle, and can withstand multiple vehicle impacts before needing to be replaced. In the embodiment shown, the side panels are made from corrugated sheet steel (e.g., 10-gauge thrie-beam).

Figure 7:
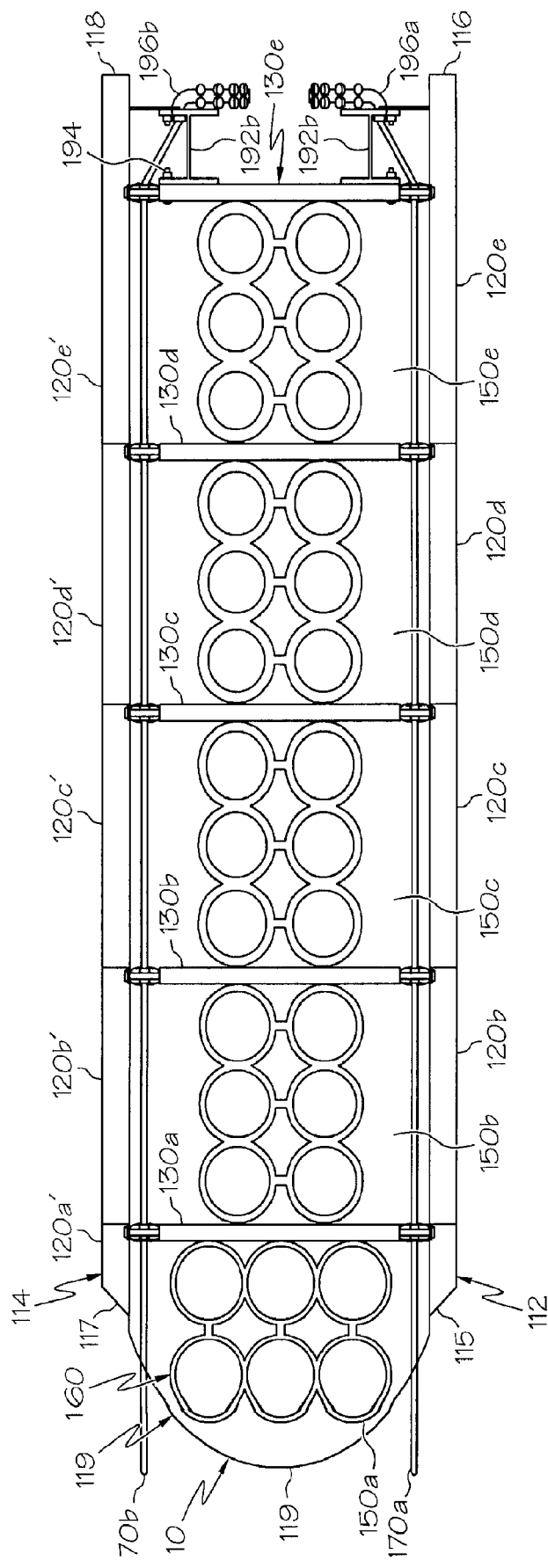
FIG. 7 is a schematic illustration, in plan view, of another embodiment of an impact attenuator system.
Figure 8:
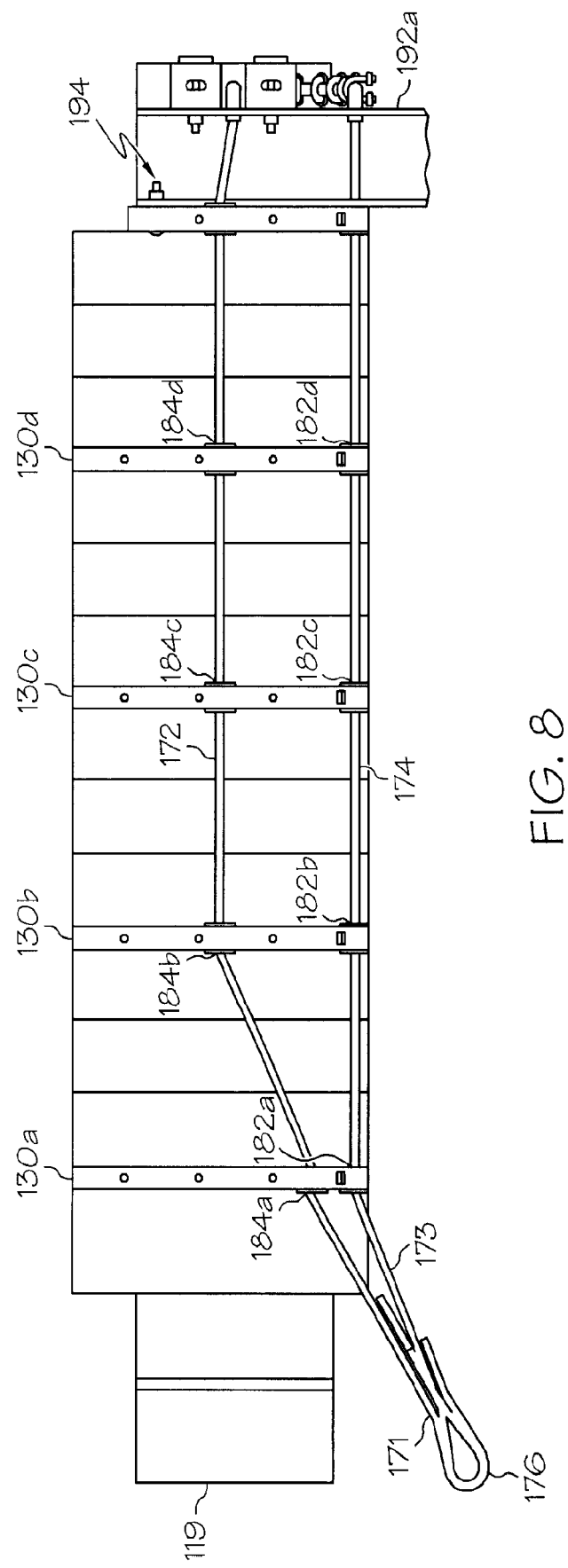
FIG. 8 is a schematic illustration, in side elevation, of another embodiment of an impact attenuator system.
Figure 9:
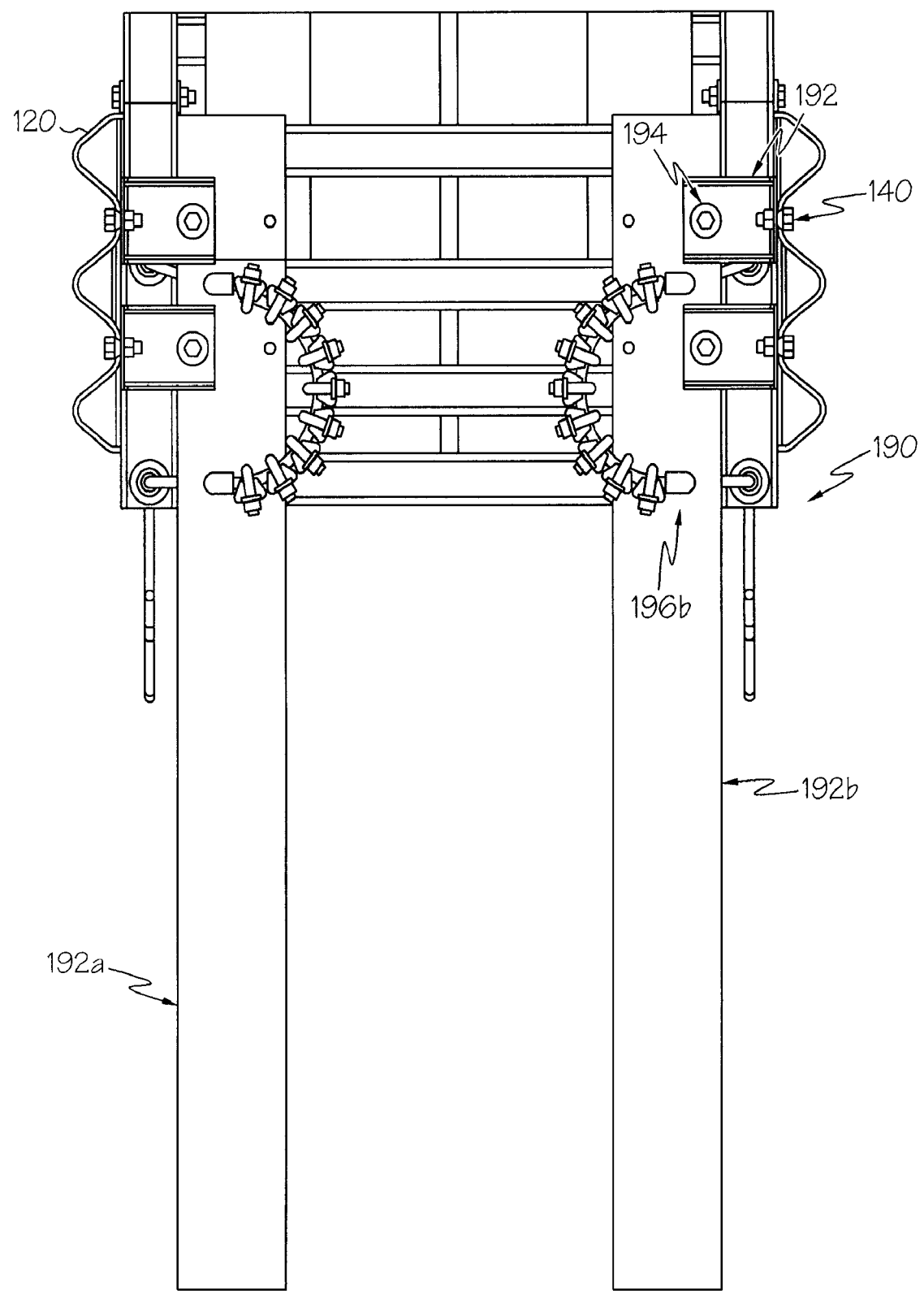
FIG. 9 is a schematic illustration, in an end elevational view, of another embodiment of an impact attenuator system.

In one embodiment, the rear anchoring mechanism 190 includes a pair of spaced apart and parallel support members 192a and 192b, such as I-beams, shown in FIGS. 7, 8, and 9. The longer last diaphragm panel 130e is connected to the support members 192a and 192b by at least one or more suitable connecting means 194 such as mounting brackets. The second end 175 of the upper cable 172 is secured to the support member 192. The second end 177 of the lower cable 174 is also secured to the support member 192. The rear anchoring mechanism 190 further includes a first elbow cable guard 196a mounted on the first I beam support member 192a and a second elbow cable guard 196b mounted on the second I beam support member 192b. The side beam panels 120 are structural members with sufficient height to shield the interior components of the system from direct impact from a vehicle and provide adequate strength to transfer load to the diaphragms 130 when impacted at any point on the face of the panels. The materials that the panels may be constructed from include, but are not limited to, High Density Polyethylene, steel, aluminum, plastic, fiber reinforced plastic and various composite materials. In certain embodiments, it is preferred that the material be recoverable, or semi-recoverable, produce no, or very little, debris when impacted by a vehicle, and can withstand multiple vehicle impacts before needing to be replaced. In the embodiment shown, the side panels are made from corrugated sheet steel (e.g., 10-gauge thrie-beam).

It is to be understood that, in other embodiments, the anchoring system 170 can comprise fewer or more cables.

The front anchoring mechanism 176 is securely anchored to the ground (not shown) in a suitable manner at or below ground level in front of the impact attenuator system 10. As best seen in the embodiment shown in FIG. 8, the lower cable 174 extends through a lower cable guide opening 178 in each of the upright members 132 in each of the diaphragm panels 130. In the embodiment shown, the lower cable 174 extends in a rearward direction at approximately three inches above ground and is attached to an anchor system (not shown) at cable height in the rear of the impact attenuator system 110.

The upper cable 172 extends through an upper cable guide opening 184 in each of the upright members 132 in each of the diaphragm panels 130. In the embodiment shown, the first diaphragm panel 130a has its upper cable guide opening 184a at a spaced apart first distance from the lower cable guide opening 182a; the second diaphragm panel 130b has its upper cable guide opening 184b at a spaced apart second distance from the lower cable guide opening 182b. The first distance is less than the second distance such that the upper cable 172 is first guided in an upward direction from the front anchoring mechanism 176 and is guided in an upward direction from the first diaphragm panel 130a to the second diaphragm panel 130b. Thereafter, the upper cable 172 extends from the second diaphragm panel 130b through the diaphragm panels 130c-130e in a rearward direction that is substantially parallel to the lower cable 174. Both the upper cable 172 and the lower cable 174 are anchored at the second anchoring mechanism 190. In the embodiment shown, the portion of the upper cable 172 that extends through the diaphragm panels 130c-130e is about fifteen inches above ground level.

In certain embodiments the side beam assemblies form a rigid U-shaped structure which preferably is made of a composite material, including for example, metals such as steel, and plastics such as high density polyethylene. The composite material is recoverable, or semi-recoverable, produces no, or very little, debris when impacted by a vehicle, and can withstand multiple vehicle impacts before needing to be replaced. The hyperelastic elements crush in the direction of impact which is the primary energy dissipating mechanism. Because of the geometry of the hyperelastic elements shown in the current embodiment, the hyperelastic elements also spread outward as they crush.

The hyperelastic material used herein is a novel energy absorbing material that behaves in a rate-independent hyperelastic manner. The hyperelastic material behaves in a manner such that its permanent set is minimized so that the energy absorbing material maintains consistent force-displacement characteristics over a wide range of impact velocities while remaining fully recoverable.

Hyperelastic Materials

The hyperelastic material behaves in a hyperelastic manner under dynamic loadings of high strain rates of up to at least about 900-1000 $s^{-1}$. The hyperelastic material uniquely allows for direct impacts and also allows for the instantaneous recovery of the components from which the material is made. The hyperelastic material has non-linear elastic responses in energy absorbing applications.

The hyperelastic material is suitable for use in various impact attenuating environments and products. As such, it is within the contemplated that a wide variety of other types of products may be made using the hyperelastic materials described. Examples of such products include, but are not limited to, protective gear for work and sports, including helmets and pads, car seats, pedestal seats on helicopters, bumpers for loading docks, and the like.

Elastomers belong to a specific class of polymeric materials where their uniqueness is their ability to deform to at least twice their original length under load and then to return to near their original configuration upon removal of the load. Elastomers are isotropic, nearly incompressible materials which behave as linear elastic solids under low strains and low strain rates. As these materials are subjected to larger strains under quasi-static loading, they behave in a non-liner manner. This unique mechanical behavior is called hyperelasticity. Hyperelastic material have the ability to do work by absorbing kinetic energy transferred from impact through an elastic deformation with little viscous damping, heat dissipation (from friction forces) or permanent deformation (i.e., permanent set). This mechanical energy can then be returned nearly 100% allowing the components to return to their original configuration prior to impact with negligible strain.

An elastomer's behavior is dependent upon strain rate and strain history under dynamic loading, which is called viscoelasticity. The viscoelastic nature of elastomers causes problems resulting in hysteresis, relaxation, creep and permanent set. Permanent set is when elastomers undergo a permanent deformation where the material does not return to zero strain at zero stress. This deformation however, tends to stabilize upon repeated straining to the same fixed strain. Also characteristic of elastomers is the Mullins effect—the phenomenon whereby the second and succeeding hysteresis loops exhibit less area than the first, due to breaking of physical crosslinks; may be permanent or reversible. Crystallization in elastomers can also induce and effect hysteresis, which dominate viscoelastic effects at high strain, and strain-rate sensitivity. To further add to the complexity of the mechanical behavior of elastomers is the visco-hyperelastic response at high strain under dynamic loading, which is difficult to characterize and test. Often stress-strain data from several modes of simple deformation (i.e., tension, compression and shear) are required as input to material models, which predict their performance.

In one embodiment hyperelastic materials may absorb great amounts of mechanical energy while maintaining full recoverability. Traditionally, the viscous component of rubbers dominates under dynamic loading; whereby the strain rate dependence is accounted for by visco-hyperelastic models, where the static response is represented by a hyperelastic model (based on elastic strain energy potential) in parallel with a Maxwell model which takes into account strain rate and strain history dependent viscoelasticity.

Method of Making Materials

Polyurethane elastomers represent a class of materials known to possess hyperelastic behavior. Such materials are highly versatile from the design standpoint. Through proper raw material, formulation, and/or process selection, polyurethane elastomers can be tailored to achieve a wide range of properties, including damping characteristics that allow an impact attenuator system to control rebound.

In particular, by selecting proper components and controlling the degree of phase segregation in the elastomer, desired damping properties can be affected.

Polyurethane cast elastomer systems may be comprised of an isocyanate component, typically methylene diphenyl diisocyanate (MDI), a long chain polyol or mixture of polyols, and a short chain glycol. Such systems are generally mixed with a slight excess of isocyanate groups which are available to undergo further reaction during the cure and post-cure cycle. These reactions result in a fully cured polymer system which is slightly crosslinked and thus exhibits a high degree of recoverability subsequent to deformation. This characteristic makes these polymer materials suitable for hyperelastic elements in an impact attenuator barrier system. Hyperelastic materials may have the following characteristics: Shore D hardness values of about 40 to about 70. Maximum tensile stress ranging from about 4000 to about 7000 psi, elongation at break ranging from about 150% to about 700%, and minimal modulus change and a tan δ value not less than 0.05 over the temperature range of interest.

Hyperelastic materials with suitable rebound response may be formed by a full prepolymer approach in which the entire long chain polyol component is pre-reacted with the isocyanate component to produce an isocyanate terminated prepolymer which, in turn, is reacted with the short-chain glycol to produce the elastomer.

An alternative approach is the use of a quasi prepolymer system in which a portion of the long-chain polyol is pre-reacted with the isocyanate component. In this case, the elastomer is formed by reaction product of the quasi-prepolymer with the short chain glycol and the remainder of the long-chain polyol component.

The process by which the components are brought together may include heating the components to process temperatures, degassing components to remove any dissolved or entrained gases, precisely metering components to a mix chamber, dynamically mixing the components, and dispensing mixed material into a mold from which the cured part is subsequently demolded and subjected to an appropriate post cure cycle. Due to differences in component melt points and viscosity, appropriate component temperatures, as well as mold temperatures, may range from approximately 100° F. to 250° F.

Reactive components may be combined in a proportion that provides about 1% to about 10% excess of isocyanate groups in the total mixture, or about 2% to about 5% excess of isocyanate groups in the total mixture. A catalyst package may be utilized which facilitates the chemical reaction of the components and allows demolding of the parts within a reasonable time frame. The gel time or work life of the system should not be shorter than the mold filling time to ensure uniform material properties throughout all sections of the part.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

Material

A hyperelastic material was prepared using an MDI-polyether quasi-prepolymer system. The prepolymer had a free isocyanate content of approximately 13.3%. A long chain polyether component based on polytetramethylene glycol was utilized. The polyol had OH# of approximately 56. The short-chain diol utilized was hydroquinone bis(2-hydroxyethyl) ether (HQEE) and accounted for approximately 40% by weight of the total hydroxyl-containing components of the mixture.

Reactive components were combined in a proportion that provided approximately 5% excess of isocyanate groups in the total mixture. A typical polyurethane catalyst package was utilized to accelerate the reaction and shorten demold time. Catalyst loading was adjusted to provide a gel time of approximately three minutes.

A three component liquid casting machine equipped with precision gear pumps to accurately meter components and a dynamic mix head to obtain adequate mix quality and heating capability were used. The prepolymer, polyol, and short-chain diol reactive components were charged into heated day tanks and maintained at proper process temperatures. Prepolymer and polyol were held at temperatures between 160-180° F. The HQEE was held at 240° F. Catalyst components were added to the tank containing the short chain diol and mixed thoroughly. All components were then degassed under a minimum vacuum of 28 inches Hg until all dissolved gasses were removed. A dry nitrogen pad was then applied to each tank to protect components from moisture exposure. Pad pressure must be adequate to ensure material feed to a suction side of a metering pump. Each pump was calibrated to ensure delivery of an appropriate amount of the respective component to the mix chamber. The total material throughput was approximately 20 pounds per minute. A mold was heated to an approximate range of 200° F. to 240° F. prior to dispensing mixed material into the cavity. The mold temperature was maintained at about 200° F. after pouring to ensure proper cure of the material prior to demolding the part. The part was demolded in approximately 20 minutes and subsequently post-cured at temperatures between about 200° F. to 250° F. for approximately 12 to 36 hours to ensure completion of the chemical reaction and attainment of material properties.

Example 2

Testing Material

Figure 10:
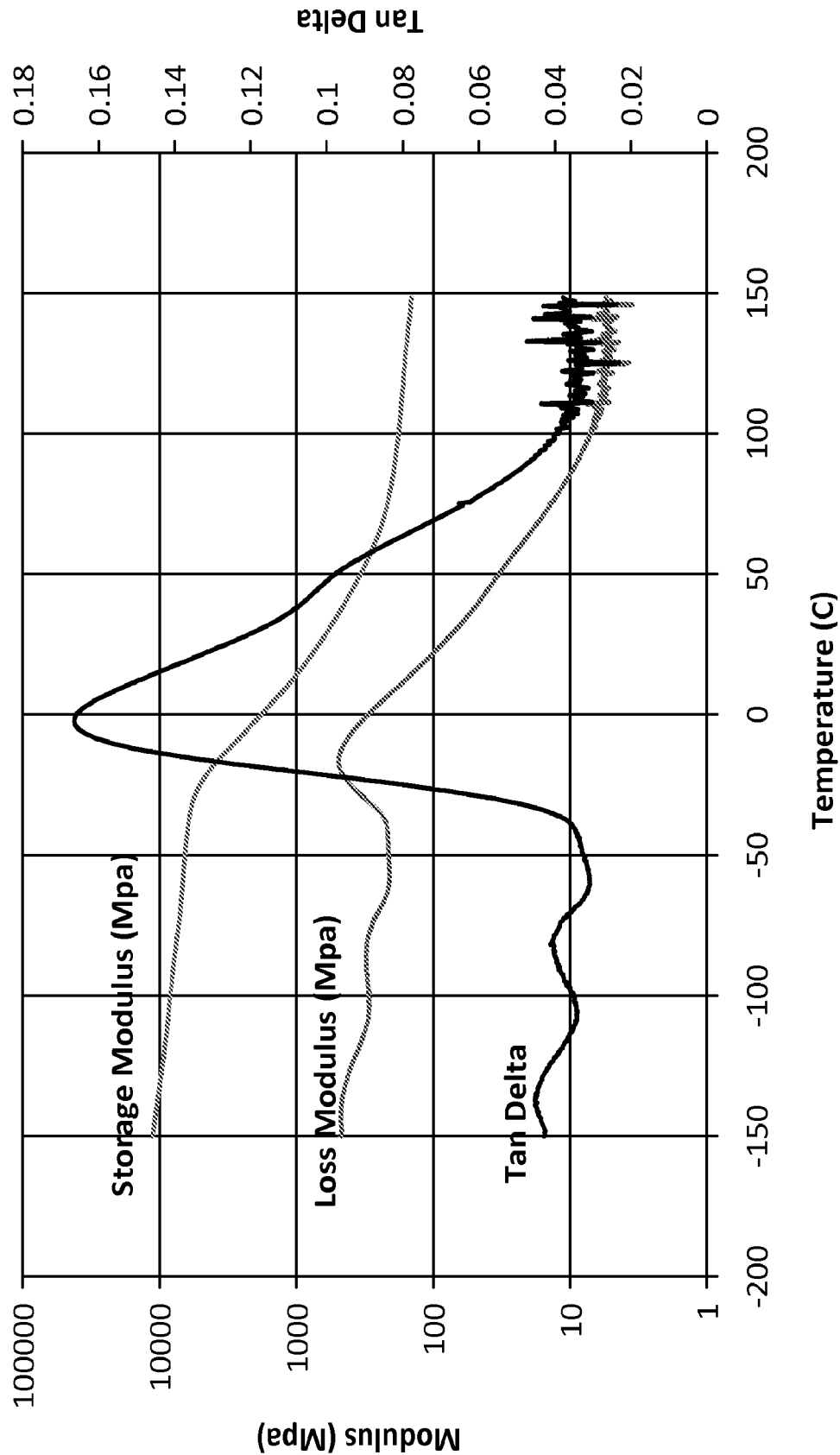
FIG. 10 is a graph of Storage Modulus (E'), Loss Modulus (E"), and Damping (tan δ) vs Temperature for the material made in Example 1.

A material for thermoset, cast polyurethane components for use in making the hyperelastic elements in the impact attenuator system was formulated. DMA tests were conducted using a TA Instruments Q800 DMA system to measure the storage modulus E', the loss modulus E" and the mechanical loss (damping), tan δ over a temperature range of −150 to 150° C. changing at a rate of 3° C. per minute, and at 1 Hz. The results of those tests are shown in FIG. 10. Tan δ may be greater than 0.05 and of relatively constant value. Tan δ may be greater than 0.1 and of relatively constant value. The tan δ for the material made in Example 1 is between 0.10 and 0.14 throughout the operating temperature range of −15 to 45° C. The glass transition temperature ($T_g$) onset, as determined by the storage modulus, was measured at approximately −27° C., and there was no melting transition present.

Samples were prepared from a formulation having the physical properties of: a storage modulus of approximately 679 MPa, a loss modulus of approximately 86 MPa, and a tan δ of approximately 0.13, when measured at a temperature of approximately 25° C., shown in FIG. 10.

Figure 11:
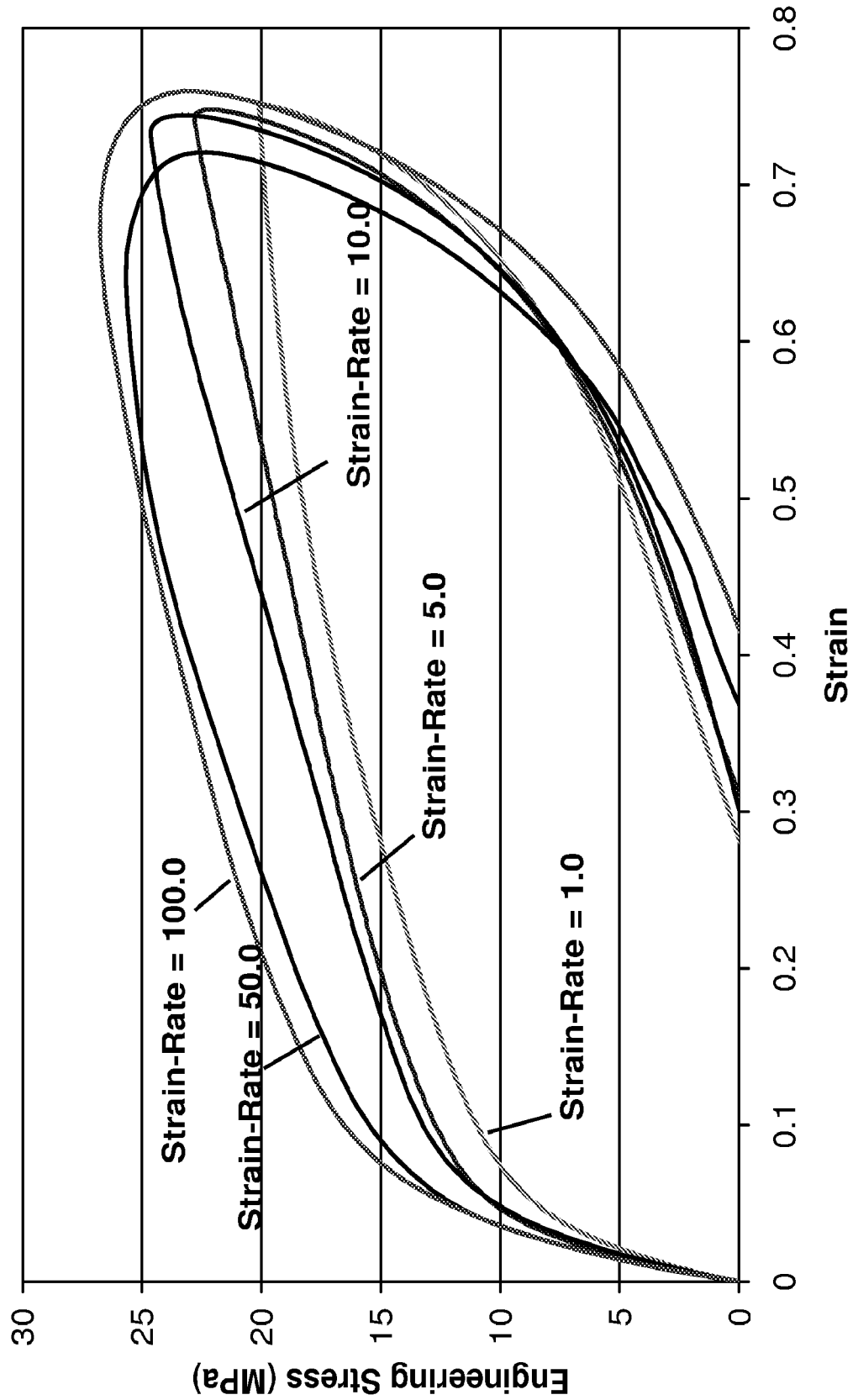
FIG. 11 is a graph of engineering tensile stress-strain plots for the material made in Example 1 at various strain-rates.
Figure 12:
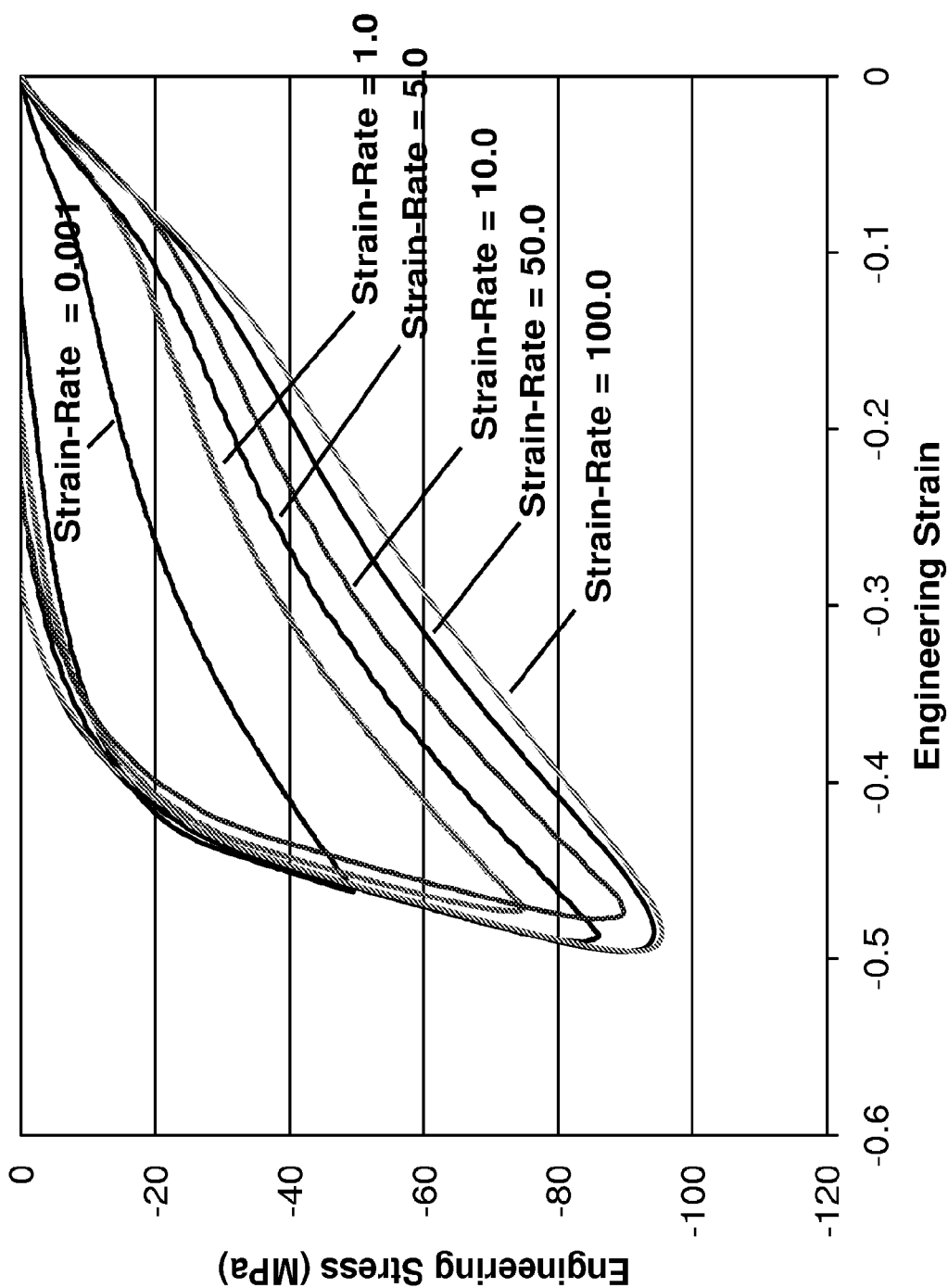
FIG. 12 is a graph of engineering compressive stress-strain plots for the material made in Example 1 at various strain-rates.

The samples were submitted for hyperelastic testing. The results of those tests are shown in FIGS. 11 and 12. FIG. 11 is a graph showing the engineering stress-strain response of the material in tension at strain rates ranging from 0.001/s to 100/s. FIG. 12 is a graph showing the engineering stress-strain response of the material in compression at strain rates ranging from 0.001/s to 100/s.

It should be noted that this material may display moderate strain rate dependence below 50 $s^{-1}$, but becomes very insensitive to strain-rates greater than 50 $s^{-1}$. Material for use in an impact attenuator system may have minimal strain-rate dependence between 50 and 1000 $s^{-1}$.

Figure 13:
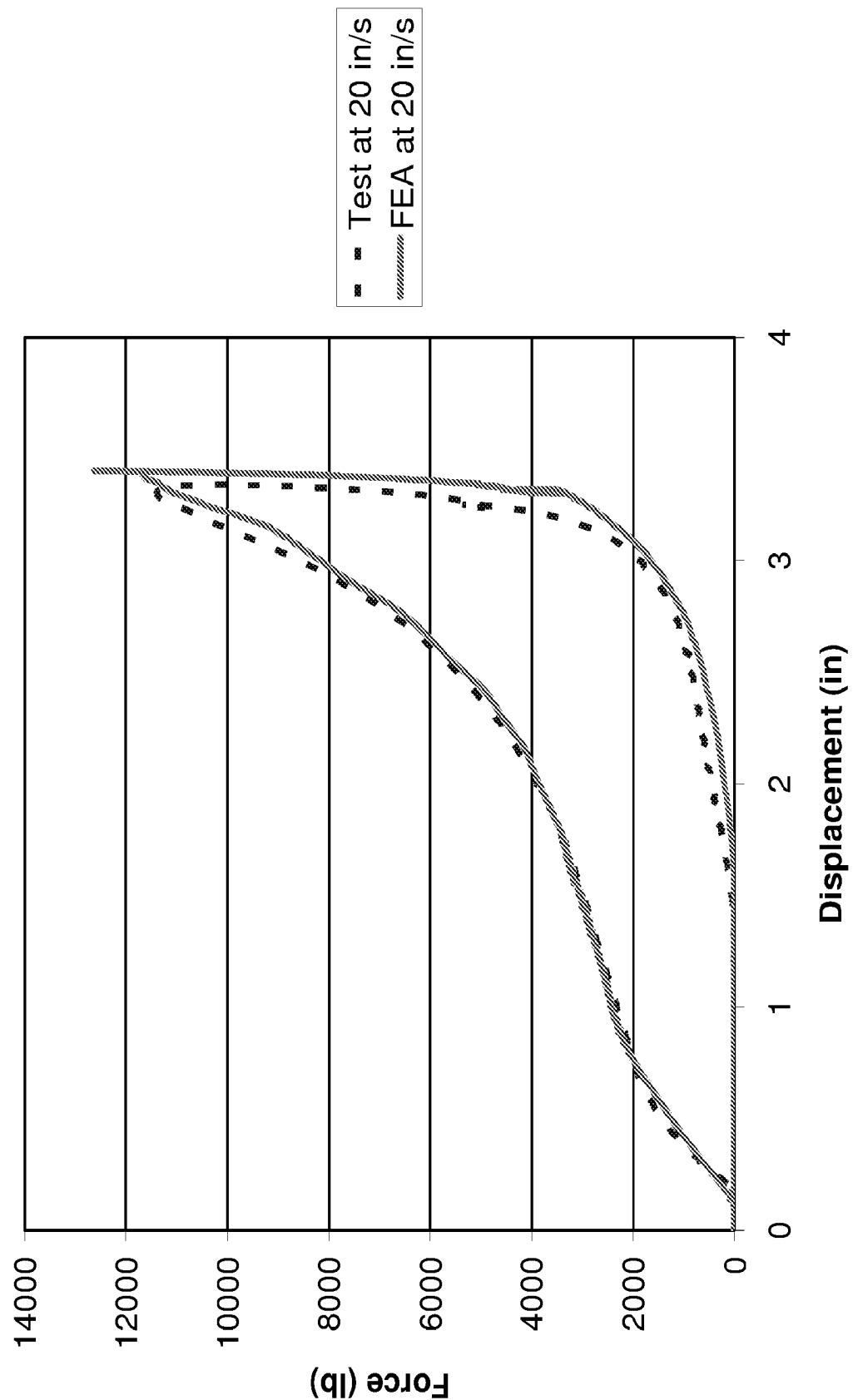
FIG. 13 is a graph of five-inch diameter cylinder test and finite element simulation at load rate of 20 in/s.

Further testing of an impact system (5-inch diameter, ¾-inch thick, 4 inches long tube) incorporating the material demonstrated the typical response of the novel energy absorbing material, where the polyurethane material absorbed energy during loading then unloaded at a considerable reduction in force and eventually recovered, almost completely, its geometric and mechanical properties. A graph of force vs displacement from the test is shown in FIG. 13. The impact system was loaded in a uniaxial testing machine under displacement control at a rate 20 in/s to a maximum displacement of 3.2 inches and then immediately unloaded at the same rate. The amount of energy loss is equal to the area of the region bounded by the loading and unloading curves.

The hyperelastic material displays these unique performance criteria and constraints given the high kinetic energies, strains and strain rates involved.

Example 3

Impact Attenuator Component

Further large scale dynamic testing of an impact system incorporating the hyperelastic material showed desirable properties where the material demonstrated high levels of energy absorption, controlled rebound and recoverability. A prototype component of the impact system was prepared from the material in Example 1.

Figure 14:
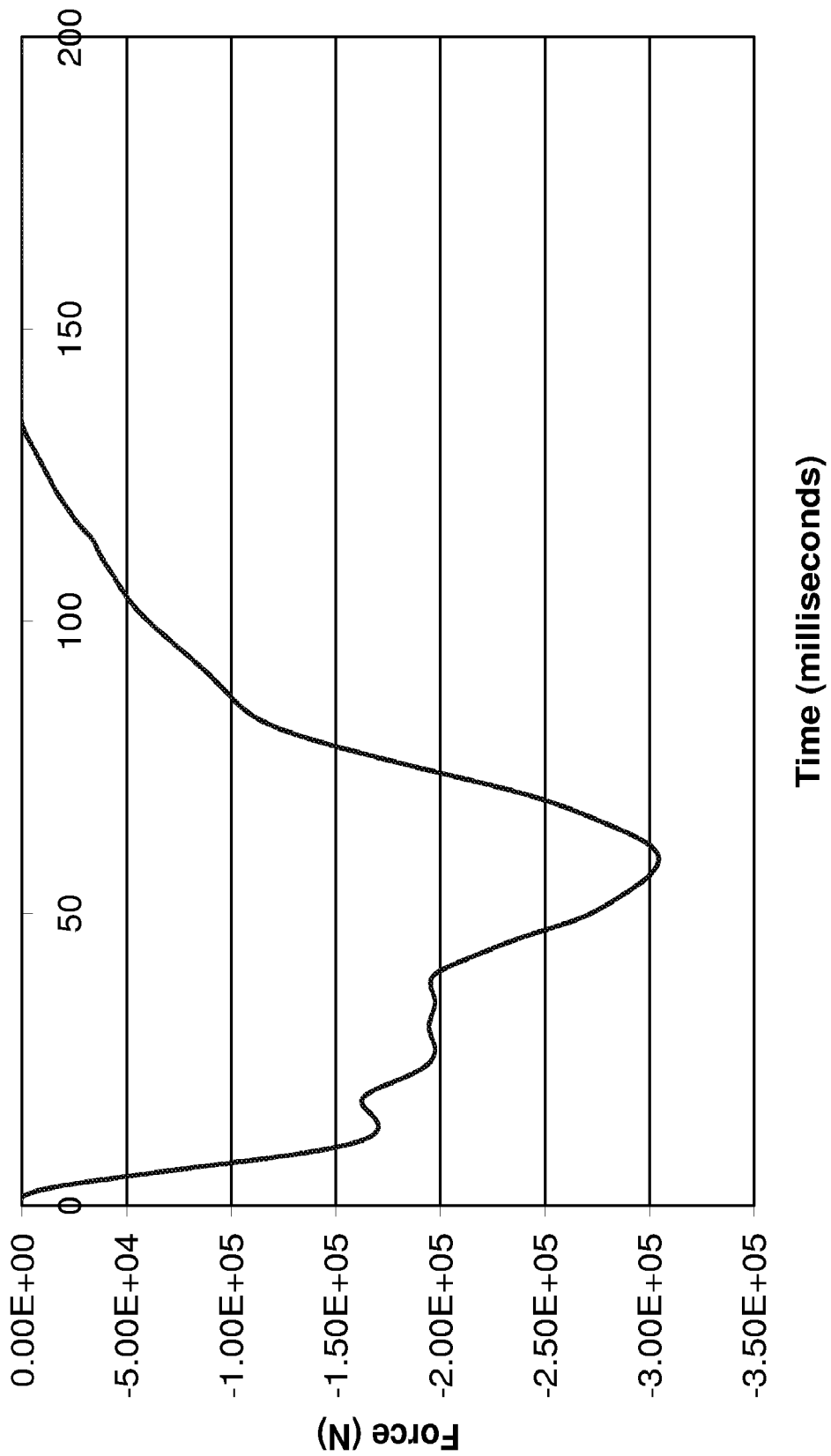
FIG. 14 is a graph of force vs. time for impact of semi-rigid vehicle into prototype component at 20.8 mph (33.5 km/hr).
Figure 15:
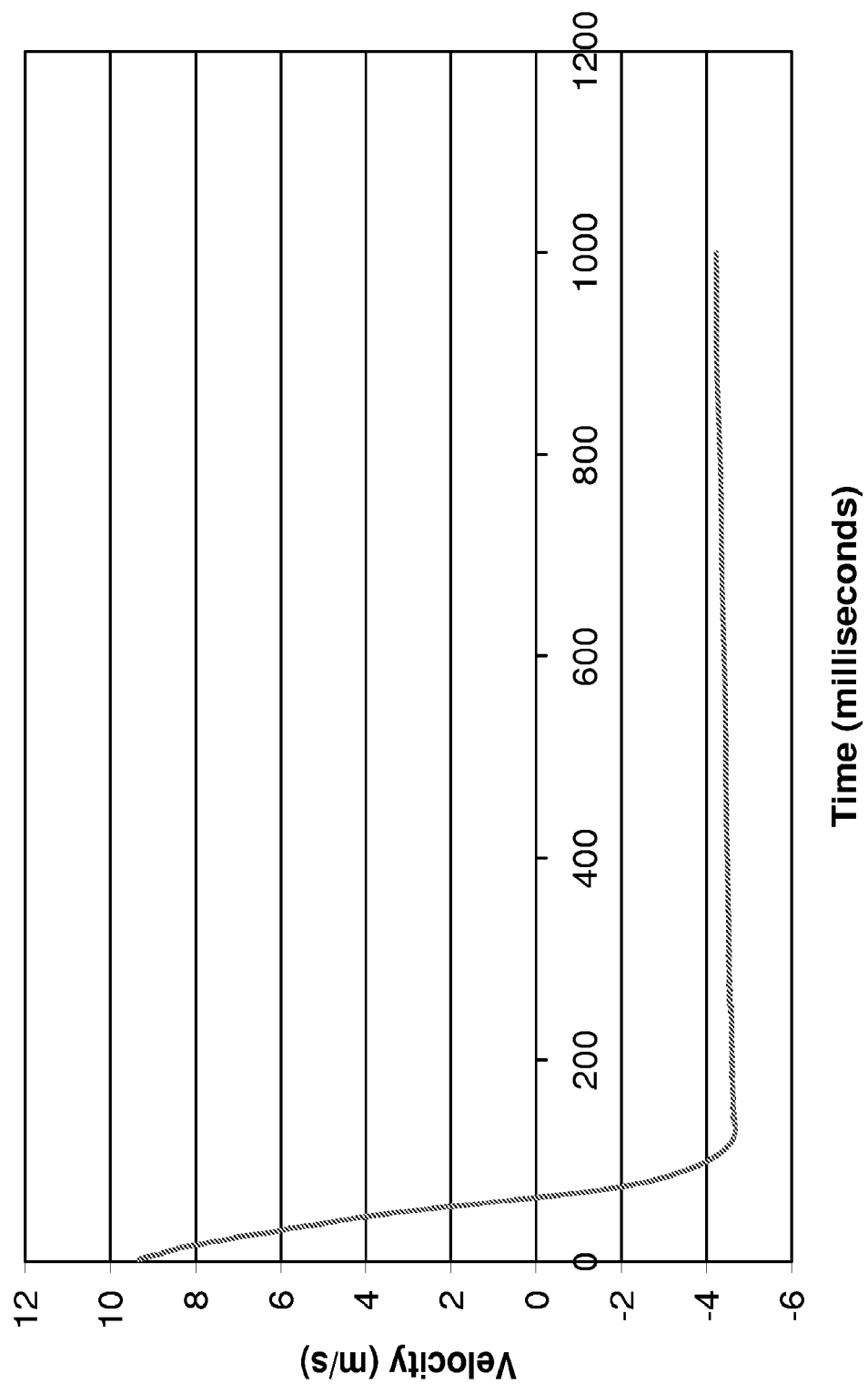
FIG. 15 is a graph of velocity vs. time for impact of semi-rigid vehicle into prototype component at 20.8 mph (33.5 km/hr).
Figure 16:
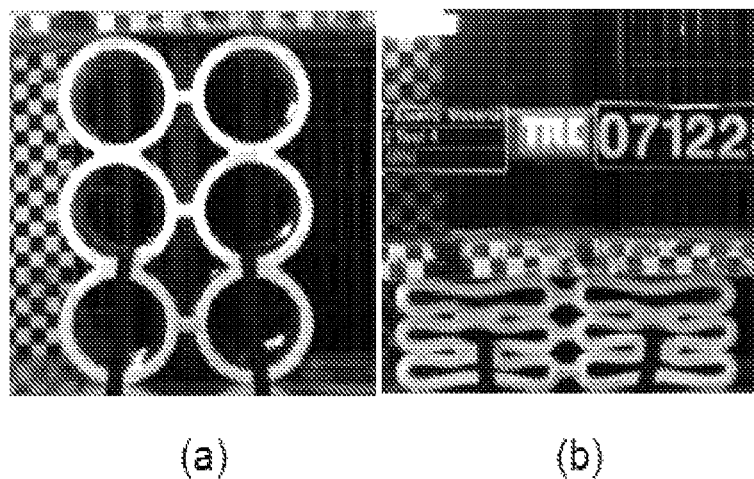
FIG. 16 is a photograph of a test article (a) just prior to impact and (b) at maximum dynamic displacement.
Figure 17:
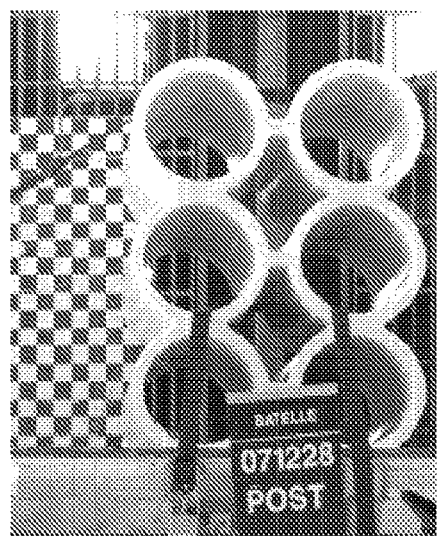
FIG. 17 is a photograph of the test article after the load was removed from the test article.

The prototype component was impacted by a 2,857 lb (1,296 kg) semi-rigid cart head-on at the centerline of the cart and test article at a speed of 20.8 mph (33.5 km/hr). FIG. 16 shows the test article (a) just prior to impact and (b) at maximum dynamic displacement. FIG. 17 is a photograph of the test article taken after the test which shows the recoverability of the component. FIG. 14 shows a graph of force vs time of the impact event measured by an instrumented wall at the back of the prototype component. FIG. 15 shows a graph of velocity vs. time of the impact event measured from an accelerometer mounted onto the vehicle.

What is claimed is:

1. An energy absorbing hyperelastic material wherein the material has a damping capacity tan δ of not less than about 0.05 for temperatures between −15° C. and 45° C. and the stress-strain response is strain-rate independent between 50 and 1000 $s^{-1}$, wherein the hyperelastic material has a tan δ that varies by not more than 0.1 for temperatures between −15° C. and 45° C.

2. The energy absorbing hyperelastic material of claim 1, wherein the tan δ is not less than about 0.10.

3. The energy absorbing hyperelastic material of claim 1, wherein the hyperelastic material has a Shore D hardness from about 40 to about 70.

4. The energy absorbing hyperelastic material of claim 1, wherein the hyperelastic material has a maximum tensile stress ranging from about 4000 to about 7000 psi.

5. The energy absorbing hyperelastic material of claim 1, wherein the hyperelastic material has an elongation at break ranging from about 150% to about 700%.

6. The energy absorbing hyperelastic material of claim 1, wherein the material has no $T_g$ onset between about −15° C. and about 45° C.

7. The energy absorbing hyperelastic material of claim 6, wherein the material does not have a melting temperature.

8. The energy absorbing hyperelastic material of claim 6, wherein the material has no melting temperature onset between about −15° C. and about 45° C.

9. An impact attenuator system comprising the energy absorbing hyperelastic material of claim 1.

10. The impact attenuator system of claim 9, wherein the tan δ of the energy absorbing hyperelastic material is not less than about 0.1.

11. The impact attenuator system of claim 9, wherein the energy absorbing hyperelastic material has no $T_g$ onset between about −15° C. and about 45° C.

12. The impact attenuator system of claim 11, wherein the energy absorbing hyperelastic material does not have a melting temperature.

13. The impact attenuator system of claim 11, wherein the energy absorbing hyperelastic material has no melting temperature onset between about −15° C. and about 45° C.

14. The energy absorbing hyperelastic material of claim 1, wherein the material is formed from a mixture comprising:
   an MDI-polyether prepolymer, wherein the prepolymer had a free isocyanate content of from about 10% to about 15%;
   at least one long chain polyether or polyester polyol, wherein the polyol had an OH# of from about 20 to about 80;
   at least one short chain diol, wherein the diol was from about 30% to about 45% of the total hydroxyl-containing components;
   at least one catalysts; and
   wherein the proportion of the components provided from about 2% to about 10% excess isocyanate groups.

15. The energy absorbing hyperelastic material of claim 14, wherein at least one short chain diol is hydroquinone bis(2-hydroxyethyl)ether.

16. The impact attenuator system of claim 9 comprising:
   at least one first side beam assembly and at least one opposing, or second, side beam assembly, the first and second beam assemblies are in opposed relationship, the first beam assembly having a first, or leading, end and a second end, and the second beam assembly having a first, or leading, end and a second end;
   at least one nose assembly that is secured to the first end of the first beam assembly and to the first end of the second beam assembly;
   each side beam assembly further including a plurality of side panels, each side panel having a first end and a second end, wherein the second end of a first panel overlaps the first end of the adjacent panel whereby the side panel members are in a nested linear arrangement;
   each side panel defining at least one longitudinally extending opening wherein adjacent slots on adjacent side panels at least partially overlap;
   at least one diaphragm panel, wherein the diaphragm panel is positioned between opposing side panels and is secured to the opposing side panels by at least one securing mechanism, wherein the securing mechanism extends from an outer surface of the side panel through the slot, the securing mechanism being capable of being longitudinally moved along the slot;
   at least one bay defined by the opposing side panels and the diaphragm panels;
   at least one hyperelastic member positioned in each bay, wherein the stiffness of hyperelastic members are not all the same;
   and, at least one anchoring system including at least one cable which is secured at a first end to a first anchoring mechanism and is secured at a second end to a second anchoring mechanism.

17. The impact attenuator system of claim 16, wherein the stiffness of hyperelastic members further from the nose assembly is higher than hyperelastic members closer to the nose assembly.

18. The impact attenuator system of claim 16, wherein the hyperelastic members have conjoined tubular shapes.

* * * * *